Aug. 12, 1924.

G. J. FITZPATRICK

DRIVING MECHANISM

Filed May 29, 1922

1,504,681

Witnesses
Milton Lenoir

Inventor.
George J. Fitzpatrick,
by George Heideman,
Attorney

Patented Aug. 12, 1924.

1,504,681

UNITED STATES PATENT OFFICE.

GEORGE J. FITZPATRICK, OF CHICAGO, ILLINOIS.

DRIVING MECHANISM.

Application filed May 29, 1922. Serial No. 564,370.

*To all whom it may concern:*

Be it known that I, GEORGE J. FITZPATRICK, a citizen of the United States, and a resident of Chicago, in the county of Cook and State of Illinois, have invented certain new and useful Improvements in Driving Mechanisms, of which the following is a description, reference being had to the accompanying drawing, which forms a part of my specification.

My invention relates to driving mechanism or gearing more especially intended for operating the spindle or shaft of an egg beater, cream whipper, or drill and has for its object the provision of a double driving gear mechanism whereby increased power may be obtained; smoother and steadier operation provided and therefore a construction which may be more easily operated.

The purpose of my invention is to provide a construction of comparative simplicity; wherein bearing on opposite sides of the shaft will be provided, that is to say, the thrust on the shaft or spindle will be balanced, while at the same time comparatively noiseless driving mechanism is obtained.

The objects and advantages of my invention will be more readily comprehended from the detailed description of the drawing, wherein:—

Figure 1:
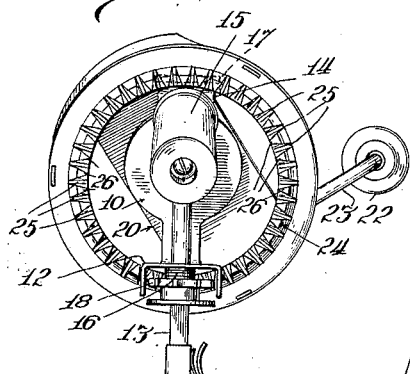
Figure 1 is a side elevation of my improved driving mechanism shown applied to the shaft or spindle of an egg beater or cream whipper.

The invention as disclosed in Figure 1 is shown applied to the shaft or spindle of an egg beater or cream whipper for the purpose of exemplification, although it will be understood that the shaft or spindle may be that of a drill or any other hand operated shaft.

Figure 2:
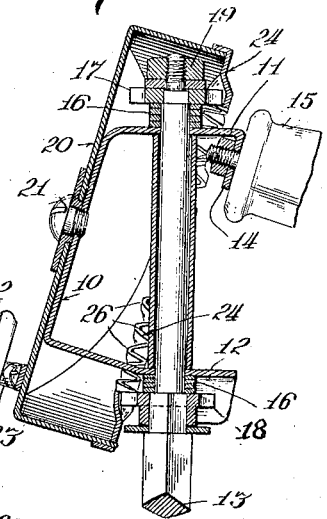
Figure 2 is an enlarged vertical sectional view of the driving mechanism, and upper end of the shaft or spindle.

The invention, as exemplified in the first four figures of the drawing comprises a supporting frame 10 which may be of the skeleton or open formation, more clearly shown in Figure 2, and stamped or formed out of sheet metal so as to provide the upper and lower extensions or arms 11, 12, preferably at diametrically opposite points, with portions of both extensions or arms arranged parallel with each other and apertured for the passage of the upper end of the spindle or shaft 13. The upper extension or arm 11 is shown bent downwardly at 14 and preferably at an inclination so as to extend parallel with the main portion of the frame 10 and this downwardly disposed portion 14 is provided with a suitable handle 15 for controlling the implement to which my driving mechanism is secured. The shaft or spindle 13, adjacent the extensions or arms 11 and 12, is preferably provided with one or more washers, as at 16, 16, to provide suitable spacing between the extensions or arms 11 and 12 of the frame 10 and the pinions 17, 18 which are secured to the shaft or spindle 13 at points above and below the frame 10; the pinions being secured to the spindle or shaft to cause the latter to rotate therewith. In the illustration of the invention as shown in Figure 2, the shaft or spindle is shown slightly reduced and squared to receive the pinions; while the upper pinion may be held in place in any suitable manner against longitudinal displacement as for example by a thumb-nut 19 adapted to screw onto the threaded end of the spindle or shaft 13.

Figure 3:
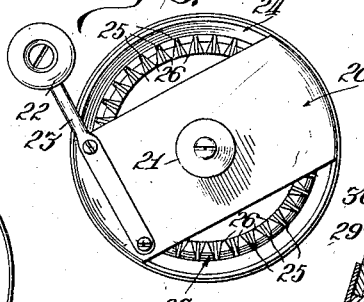
Figure 3 is a side elevation of the master or main gear and handle or crank side of the mechanism.

The main or intermediate portion of the frame 10 is disposed at an inclination, tangentially to the spindle or shaft 13, as clearly shown in Figure 2, and has a suitable frame 20 pivotally secured thereto at 21 so as to be free to rotate by means of an operating crank or handle 22 which is secured to the frame 20 to one side of its pivotal point and preferably adapted to extend slightly beyond the periphery as shown at 23 in Figure 3. The frame 20 may be circular and somewhat cup shaped so that the sides or peripheral portion thereof will be disposed toward the spindle or shaft 13, with a portion of the side or periphery extending to the opposite side of the spindle or shaft so that the upper end of the spindle or shaft 13 in reality will extend into the frame 20 in the sloping diagonal manner clearly shown in Figure 2.

Figure 4:
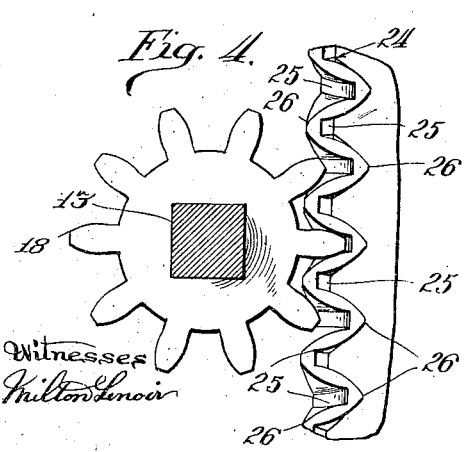
Figure 4 is an enlarged detail view of my improved gear and one of the shaft or spindle driving pinions.

The sides or peripheral portions of the frame 20 are adapted to carry an annulus or internal toothed ring 24 which is preferably constructed as shown in Figures 2 and 4, namely by forming the teeth so that each alternate tooth will be disposed to opposite sides of the gear. That is to say, my improved gear, as disclosed in the first four figures of the drawing, consists in stamping or otherwise forming the inner perimeter of the ring or annulus so that the depressions intermediate of adjacent teeth on one side of the gear will be of such depth as to constitute a tooth on the opposite side of the gear; in other words the inner perimeter of the sheet metal annulus or ring will be formed in the zig-zag manner shown in Figures 2 and 4 wherein the depressions or dales indicated at 25, intermediate of the raised portions or teeth 26 on one side of the gear, constitute the teeth on the opposite side, thereby providing oppositely disposed staggered teeth and producing a double driving or toothed surface, which permits the main or master gear 27 to be arranged tangentially or diagonally of the spindle or shaft 13. This construction and arrangement enables the gear to mesh with both pinions 17 and 18, on opposite sides of the shaft and substantially at diametrically opposite points on the large or main gear.

With my improved gear and its arrangement, a greater number of teeth will at all times be in mesh; that is to say, if two teeth of the pinion 17 at the upper end of the shaft are in mesh with the teeth of the main or master gear 24, one tooth of pinion 18 is in complete mesh with the teeth on the opposite side of the main or master gear 24, and vice versa; namely a tooth of one of the pinions will be in complete mesh with the tooth of the main or master gear on one side thereof and be disposed in a vertical plane intermediate of the two teeth of the other pinion in mesh with the teeth on the opposite side of the main or master gear; and as a result, a driving mechanism is provided having smaller intervals between the moments of complete meshing of the teeth of the pinions and the gear, with the result that a more uniform and constant speed is given to the spindle or shaft to which my driving mechanism is applied and therefore greater power and easier operation produced.

Where the invention is applied to the spindle or shaft of an egg beater or cream whipper, the arrangement of the handles, namely with the controlling handle 15 arranged toward one side and at the inclination shown in Figure 2, the hand of the operator will not obstruct the vision of the operator, while at the same time the operator's hand is placed where it is less likely to interfere or come in contact with the gearing.

Figure 5:
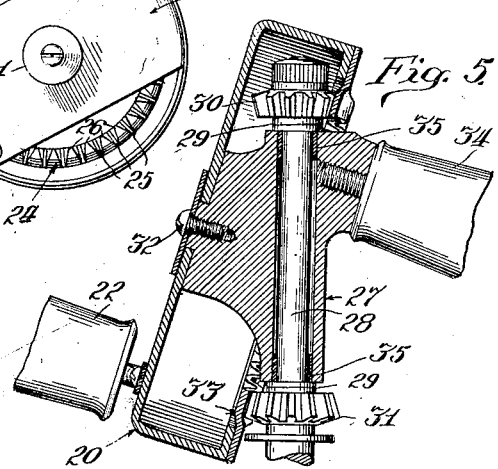
Figure 5 is a vertical sectional view of a modified form.

In Figure 5 I show a modified form of my invention insofar as the method of mounting or supporting the spindle or shaft is concerned and at the same time illustrating the application of my invention to a drill-spindle or shaft. As the mechanism carried or operated by the shaft forms no part of my present invention, a portion of the shaft is broken away; it may be of the usual construction, provided at its lower end with a bit-holding chuck or clamp. In the exemplification shown in Figure 5, instead of employing the skeleton type of fame 10 previously described and shown in Figure 2, I show a solid shaft supporting frame 27 which may be of cast metal and apertured longitudinally for the pasage of the spindle or shaft 28. The opposite ends of the casting are preferably arranged parallel and shown provided with washers as at 29 to maintain the pinions 30 and 31 in slight spaced relation with the casting 27. One side of the casting or frame 27 is arranged at an inclination, tangentially to the axis of the shaft 28, similar to the main portion of the frame 10 in Figures 1 and 2 and this inclined side has the frame 20, (which may be similar to the frame in Figure 2) pivotally secured thereto at 32 so as to permit the frame 20 to rotate.

The frame 20, like that in Figure 2, is provided with a suitable operating handle 22 and the frame 20—(which is disposed in the sloping diagonal manner shown in Figure 2 so as to have a portion of the periphery or side of the frame 20 located on opposite sides of the spindle or shaft 28)—is provided with an internally toothed annulus or ring 33 which may be similar in construction to the ring 24 shown in Figure 2, or which may be of suitable cast metal with the teeth thereof preferably arranged in the staggered relation and disposed on opposite sides of annulus or ring, as shown in Figures 2 and 4 and previously described, so as to mesh with opposite sides of the two pinions 30 and 31, which latter are preferably of the bevel type shown for the purpose of providing strength and as being better adapted to a drill spindle or shaft and to the type of master gear illustrated. The spindle or shaft-holding casting 27 may be provided with any suitable handle or grasp, as for example, the handle 34 which is secured to the side of the casting opposite to that on which the gear carrying frame 20 is pivoted and the ends of the passage through the casting 27 may be provided with suitable bushings as at 35, 35 to provide proper bearing for the spindle or shaft 28.

I have shown my invention as applied to egg beater spindles and to the shaft or spindle of a drill or other suitable bit and have described the same in terms which are employed merely as terms of description and not as terms of limitation, as structural modifications are possible and may be made without, however, departing from the spirit of my invention.

What I claim is:—

1. Driving mechanism of the character described, comprising a holding frame provided with sloping sides, a shaft rotatably mounted in said frame and disposed therethrough in a diagonal manner relative to the sloping sides of the frame, a bridge member rotatably secured to one sloping side of said frame and extending to the upper end of the shaft, an internally toothed gear secured to said bridge member in an inclining diagonal manner relative to the longitudinal axis of the shaft and adjacent to opposite sides thereof, means whereby rotative movement of the gear will be transmitted to said shaft, and a handle secured to said bridge member whereby the latter and said gear may be rotated.

2. Driving mechanism of the character described, comprising a holding frame provided with sloping surfaces, a handle secured to one of said sloping surfaces, a shaft disposed diagonally through the frame relative to the sides thereof and rotatably mounted in said frame against longitudinal movement, a gear carrying frame rotatably secured to one sloping side of the holding frame, at an angle to the longitudinal axis of the shaft and flanged to extend across the upper end of the shaft, a main gear secured to said gear carrying frame, with the holding frame and the shaft extending diagonally within the gear, said gear holding frame and gear being rotatably carried by the holding frame in an inclining diagonal manner at an angle to the longitudinal axis of the shaft, means secured to the shaft at opposite ends of the holding frame for holding the shaft against longitudinal movement, means secured to the shaft and adapted to engage with opposite sides of the gear whereby the shaft is actuated when said gear is rotated, and a handle secured adjacent to the periphery of the gear carrying frame whereby said frame and gear may be operated.

3. Driving mechanism of the character described, comprising a holding frame, a shaft rotatably mounted in the frame and disposed therethrough in a diagonal manner relative to the sides of the frame, a member rotatably secured to one side of said frame, an annular member or ring whose inner perimeter is given zig-zag formation to provide teeth alternately disposed toward opposite sides of the ring, said annular member being carried by said first mentioned member so as to be disposed in a diagonal manner relative to the longitudinal axis of the shaft, a pair of pinions secured to the shaft at opposite ends of the holding frame so as to cause the shaft to rotate therewith and to hold the shaft against longitudinal movement, with the relation between the pinions and the teeth of the annular member or ring being such that a meshing tooth of one pinion and the annular member or ring will be disposed in a vertical plane intermediate of two meshing teeth of the other pinion and annular member or ring, a crank secured to said first mentioned member whereby the latter with the annular member or ring may be rotated, and a handle secured to one side of said holding frame and arranged substantially parallel with said crank.

4. Driving mechanism of the character described, comprising a holding frame provided with parallel top and bottom portions and a sloping side, a shaft disposed through said frame and rotatably journaled therein, said shaft being provided with a pair of pinions, respectively, above and below the parallel top and bottom portions of the frame, an internally toothed gear rotatably secured to the sloping side of said frame so as to encircle the frame and arranged in an inclining diagonal manner relative to said shaft, said gear being arranged in mesh with both pinions on opposite sides of the shaft, and means whereby said gear may be rotated.

5. Driving mechanism of the character described, comprising a holding frame provided with substantially parallel top and bottom portions, a shaft disposed through the top and bottom portions of said frame and rotatably mounted therein, said shaft being provided with a pair of pinions each located adjacent to the point where the shaft is disposed through the top and bottom portions of the frame, a second frame rotatably secured to the holding frame so as to be disposed at an angle to the shaft, with one end thereof disposed across the upper end of the shaft, an internally toothed ring secured to the ends of said second frame in encircling relation with the holding frame and arranged in engagement with both pinions, at opposite sides of the shaft, to cause rotation of the pinions and shaft in one direction, and a hand crank secured to said second frame whereby the latter with the toothed ring may be rotated.

6. In driving mechanism of the character described, a main driving gear comprising an annulus, the inner perimeter whereof is formed to provide driving portions alternately disposed toward opposite sides of the annulus, a main holding frame disposed within said annulus, with the annulus rotatably secured on one side of said frame, while the opposite side of the frame is provided with a handle, a shaft disposed through said frame and rotatably mounted therein, a pair of pinions secured to the shaft and arranged in mesh with the opposite sides of the annulus at diametrically opposite points, and an operating handle secured adjacent to the outer perimeter of the annulus whereby the annulus may be rotated.

GEORGE J. FITZPATRICK.

Witnesses:
G. HEIDMAN,
F. A. FLORELL.